United States Patent
Liu et al.

(10) Patent No.: US 11,825,582 B1
(45) Date of Patent: Nov. 21, 2023

(54) DISPLAY DEVICE

(71) Applicant: SYNCMOLD ENTERPRISE CORP., New Taipei (TW)

(72) Inventors: Yu-Shian Liu, New Taipei (TW); Ching-Hui Yen, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 17/883,102

(22) Filed: Aug. 8, 2022

Related U.S. Application Data

(60) Provisional application No. 63/232,724, filed on Aug. 13, 2021.

(30) Foreign Application Priority Data

May 18, 2022 (TW) .................................. 111205131

(51) Int. Cl.
| | |
|---|---|
| *H02J 50/10* | (2016.01) |
| *H05B 47/19* | (2020.01) |
| *H05B 45/00* | (2022.01) |
| *F16M 11/10* | (2006.01) |
| *F16M 11/22* | (2006.01) |

(52) U.S. Cl.
CPC ........... *H05B 47/19* (2020.01); *F16M 11/105* (2013.01); *F16M 11/22* (2013.01); *H02J 50/10* (2016.02); *H05B 45/00* (2020.01); *F16M 2200/00* (2013.01)

(58) Field of Classification Search
None
See application file for complete search history.

(56) References Cited

U.S. PATENT DOCUMENTS

| | | | | |
|---|---|---|---|---|
| 8,986,181 | B2* | 3/2015 | Takazakura | G08C 17/04 483/37 |
| 2007/0236174 | A1* | 10/2007 | Kaye | H02J 50/402 320/112 |
| 2007/0276538 | A1* | 11/2007 | Kjellsson | B25J 19/0025 901/14 |
| 2008/0006748 | A1* | 1/2008 | Watanabe | F16M 11/22 248/186.2 |
| 2008/0029668 | A1* | 2/2008 | Tsuo | F16M 11/105 248/274.1 |

(Continued)

*Primary Examiner* — Daniel Kessie
(74) *Attorney, Agent, or Firm* — Muncy, Geissler, Olds & Lowe, P.C.

(57) ABSTRACT

A display device is provided. The display device includes a supporting stand, a display, a wireless charging module and a control module. The display is disposed on the supporting stand and the orientation of the display is changeable between portrait and landscape relative to the supporting stand. The wireless charging module includes a transmitting unit and a receiving unit disposed on the display and the supporting stand respectively. The transmitting unit has a transmitting coil. The receiving unit is coupled to the electronic component. The receiving unit has a receiving coil. The control module controls the transmitting unit to transmit mixed signals. When the distance between the receiving coil and the transmitting coil is less than a maximum sensing distance, the receiving unit receives the mixed signals and selectively transmits the enabling signal to at least one of the electronic components according to the mixed signal.

19 Claims, 8 Drawing Sheets

(56) References Cited

U.S. PATENT DOCUMENTS

| | | | | |
|---|---|---|---|---|
| 2008/0197710 | A1* | 8/2008 | Kreitz | H01F 38/14 307/104 |
| 2014/0014790 | A1* | 1/2014 | White | F16M 11/041 248/122.1 |
| 2016/0190870 | A1* | 6/2016 | Nagamine | H02J 50/402 307/52 |
| 2016/0352148 | A1* | 12/2016 | Ichikawa | H02J 50/12 |
| 2018/0152056 | A1* | 5/2018 | Takahashi | H02J 50/80 |
| 2020/0063911 | A1* | 2/2020 | Xiang | F16M 11/10 |
| 2020/0259344 | A1* | 8/2020 | Kim | H04M 1/0202 |
| 2021/0026409 | A1* | 1/2021 | Miles | F16M 11/041 |
| 2021/0352811 | A1* | 11/2021 | Zhou | F16M 11/38 |
| 2022/0406229 | A1* | 12/2022 | Lee | G09F 19/12 |

\* cited by examiner

DISPLAY DEVICE

CROSS REFERENCE TO RELATED APPLICATION

This application claims the benefit of U.S. Provisional Application Ser. No. 63/232,724 filed on Aug. 13, 2021, and the benefit of Taiwan Patent Application Serial No. 111205131 filed on May 18, 2022. The entirety of each Application is incorporated herein by reference.

BACKGROUND OF THE INVENTION

1. Field of the Invention

The present invention relates to a display device, especially a display device that can rotate the display and charge the supporting stand.

2. Description of Related Art

Conventionally the display usually needs to be fixed on a supporting stand to be stably installed on a wall or work surface for the user to use. Users may have different installation requirements for the display in different application scenarios and environments. For instance, in a game scene or watching a video, the user needs the orientation of the display to landscape, and in some paperwork scenarios, the orientation of the display may be adjusted to portrait.

In addition, the supporting stand used for gaming is usually equipped with light emitting diodes (LEDs) to decorate or to create an atmosphere. To make the LEDs light, a power supply system needs to be extra installed in the supporting stand and connected to the power outside the supporting stand. This will increase the production cost of the supporting stand, and the LEDs will not be able to be used if the user does not have enough sockets around when using the supporting stand.

Accordingly, there is a need in the art for a support structure that can pivotally rotate to change the orientation of the display between portrait and landscape. The power can be supplied and the signals can be transmitted to the electrical elements on the supporting stand from the display in the situation that the supporting stand does not connected to any power.

SUMMARY OF THE INVENTION

An objective of the present disclosure is to provide a display device which includes a transmitting coil disposed on a display, and a receiving coil disposed on the supporting stand. When the display is assembled with the supporting stand, the distance between the receiving coil and the transmitting coil is less than the maximum sensing distance. When the display is powered on, the current flows through the transmitting coil, the transmitting coil generates a magnetic field, and the receiving coil generates an induced current in response to the magnetic field to supply power to the electrical components on the supporting stand. Therefore, the electrical components on the supporting stand do not need to connect to another power since the power of the display can be provided to the electrical components on the supporting stand. Moreover, the mixed signal includes the enabling signal to control the operations of the electrical components to achieve the desired scenario. In addition, the supporting stand further has a shaft penetrating through the bearing unit, so the display can be rotated between portrait and landscape after being assembled with the supporting stand.

To achieve the aforesaid objective, the present invention disclose a display device which is disposed on a working surface, and includes a supporting stand, a display, a wireless charging module and a control module. The supporting stand is disposed on the working surface, and includes at least one electronic components. The display is changeable about a virtual axis between a portrait position and a landscape position relative to the supporting stand. The wireless charging module is disposed between the supporting stand and the display, and is able to operate the electronic components. The wireless charging module includes a transmitting unit and a receiving unit. The transmitting unit is disposed in the display, and has a transmitting coil. The transmitting coil is substantially disposed about a virtual axis. The receiving unit is disposed on the supporting stand and is coupled to the electronic components. The receiving unit has a receiving coil. The receiving coil is substantially disposed about the virtual axis, and is separated from the transmitting coil by a distance. The distance is less than a maximum sensing distance between the transmitting coil and the receiving coil. The control module is disposed on the display and coupled to the transmitting unit. The control module controls the transmitting unit to transmit a mixed signal to make the transmitting coil transmits power to the receiving coil, the receiving unit receives the mixed signal via the receiving coil, and the receiving unit selectively transmits an enabling signal to the at least one electronic components based on the mixed signal.

In one embodiment, the supporting stand further includes a bearing unit, the display further includes an assembly part which is detachable with the bearing unit. The transmitting coil is adjacent to the assembly part, and the receiving coil is disposed in the bearing unit.

The bearing unit further includes a front board, a main board and a rear board, the receiving coil is accommodated in the main board, and the main board is disposed between the front board and the rear board, and is pivotable relative to the front board and the rear board about the virtual axis.

The bearing unit further includes two friction rings which are disposed between the front board and main board and between the main board and the rear board respectively.

The bearing unit further includes a shaft. The shaft extends along the virtual axis and penetrates through the supporting stand, the main board and the front board, and the receiving coil is sleeved on the shaft.

In one embodiment, the supporting stand further includes a through hole, the front board has a sleeve hole, the shaft penetrates through the through hole and the sleeve hole, a cross-section of the sleeve hole is different from a cross-section of the shaft, and a cross-section of the through hole is different from the cross-section of the shaft.

In one embodiment, the distance between the receiving coil and the transmitting coil is less than 5 mm.

In one embodiment, the transmit unit further includes a transmitting processor and an amplifier. The amplifier is disposed between the transmitting processor and the transmitting coil and is electrically connected with the transmitting processor and the transmitting coil, and the mixed signal includes an alternating current (AC) voltage sub-signal and a control sub-signal.

In one embodiment, the control sub-signal has a data segment, the receiving unit further includes a receiving processor, and the receiving processor transmits the enabling signal to at least one of the electronic components according to the data segment.

In one embodiment, the control sub-signal further has a plurality of control signal regions, and each of the control signal regions has a voltage level and a time period.

In one embodiment, the control sub-signal further has a start segment and an end segment, the data segment is between the start segment and the end segment, and the start segment, the data segment and the end segment respectively includes a plurality of the control signal regions.

When the receiving processor receives the mixed signal through the receiving coil, the receiving processor calculates a clock count and determines the voltage level of each of the control signal regions.

In one embodiment, the receiving processor has a default starting level and a default ending level. When the voltage level of the start segment corresponds to the default starting level and the voltage level of the end segment corresponds to the default ending level, the receiving processor transmits the enabling signal according to the voltage level of the data segment.

The data segment includes a plurality of the control signal regions, and the receiving processor receives the voltage level of the control signal regions, transforms the voltage level to a value, and transmits the enabling signal to the corresponding electronic components according to the value.

The clock count has 1 to P time points. P is a positive integer greater than 2, and the default starting level is defined when the receiving processor determines that the voltage level is a minimum level at the first time point, and the voltage level is a maximum level at the second time point.

The start segment includes two of the control signal regions. In the first control signal region of the two of the control signal regions, the voltage level is the minimum level, and in the second control signal area of the two of the control signal regions, the voltage level is the maximum level.

The default ending level is defined when the voltage level of the receiving processor is the maximum level from the $N^{th}$ time point to the $M^{th}$ time point of the clock count, wherein N and M are respectively a positive integer between 2 and P, and M is greater than N.

In one embodiment, the end segment includes a plurality of the control signal regions, and the voltage levels of the control signal regions are the maximum level.

In one embodiment, each of the electronic component is a light emitting diode (LED) module.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Figure 1:
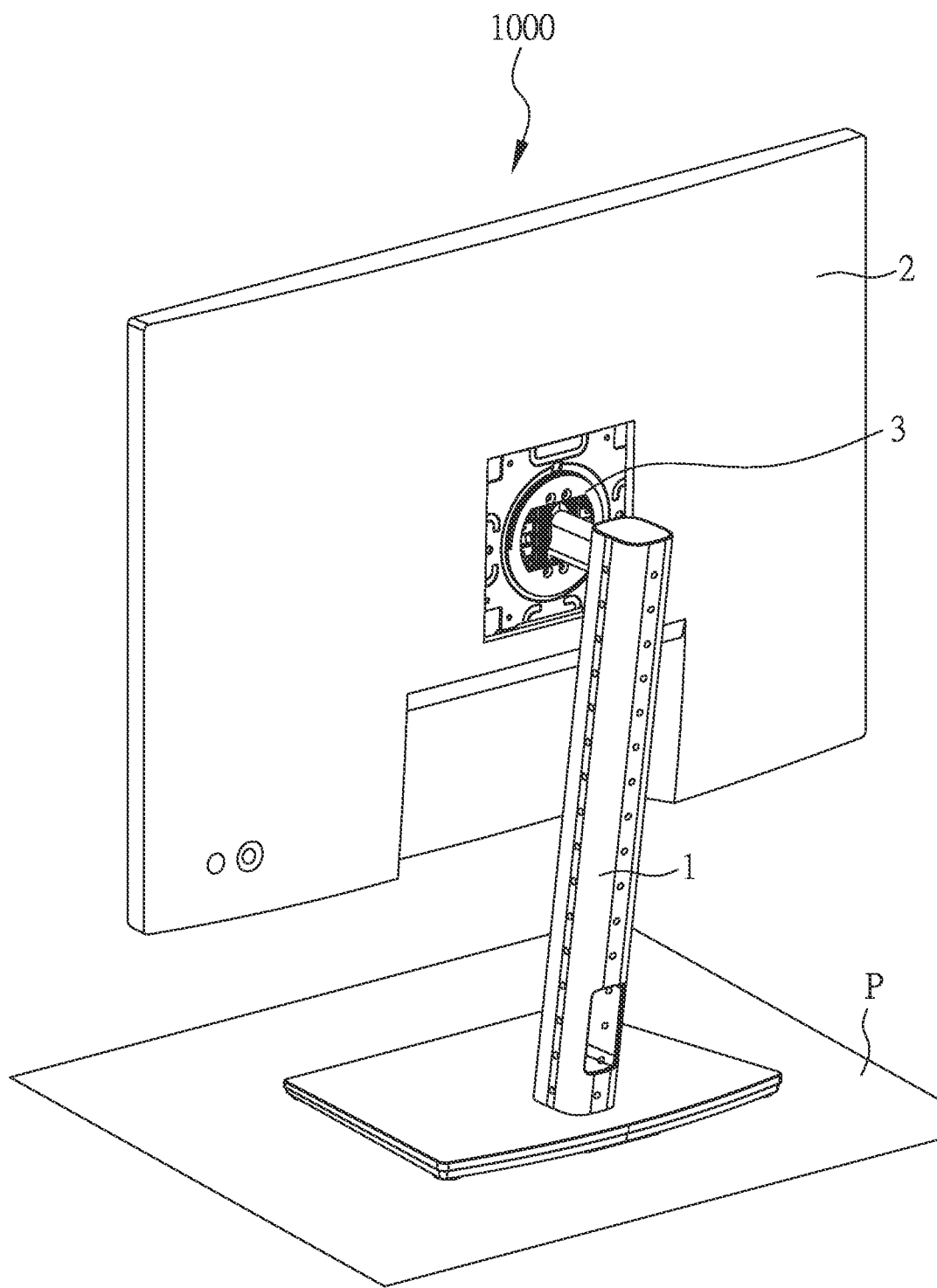
FIG. 1 is a schematic view of the display device according to the present invention.

Reference will now be made in detail to the present embodiments of the invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 2:
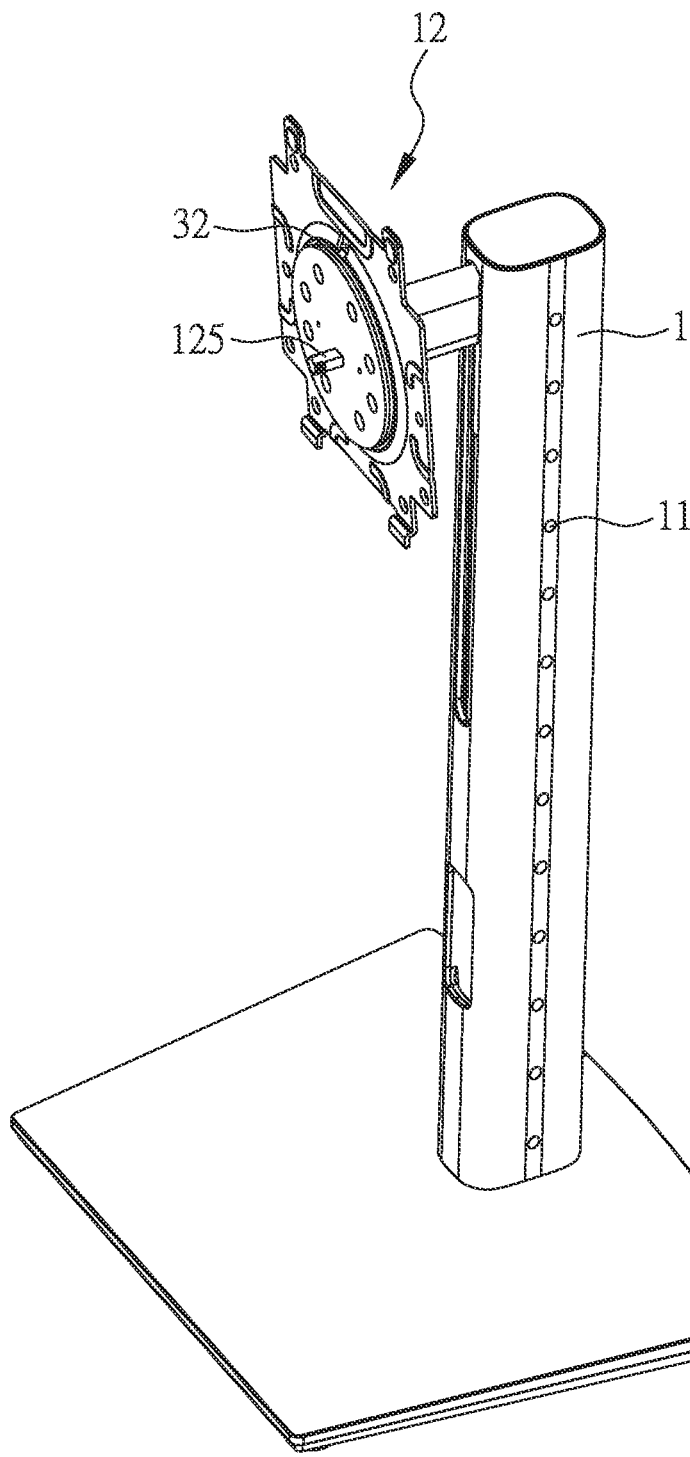
FIG. 2 is a partial schematic view of the display device according to the present invention.
Figure 8:
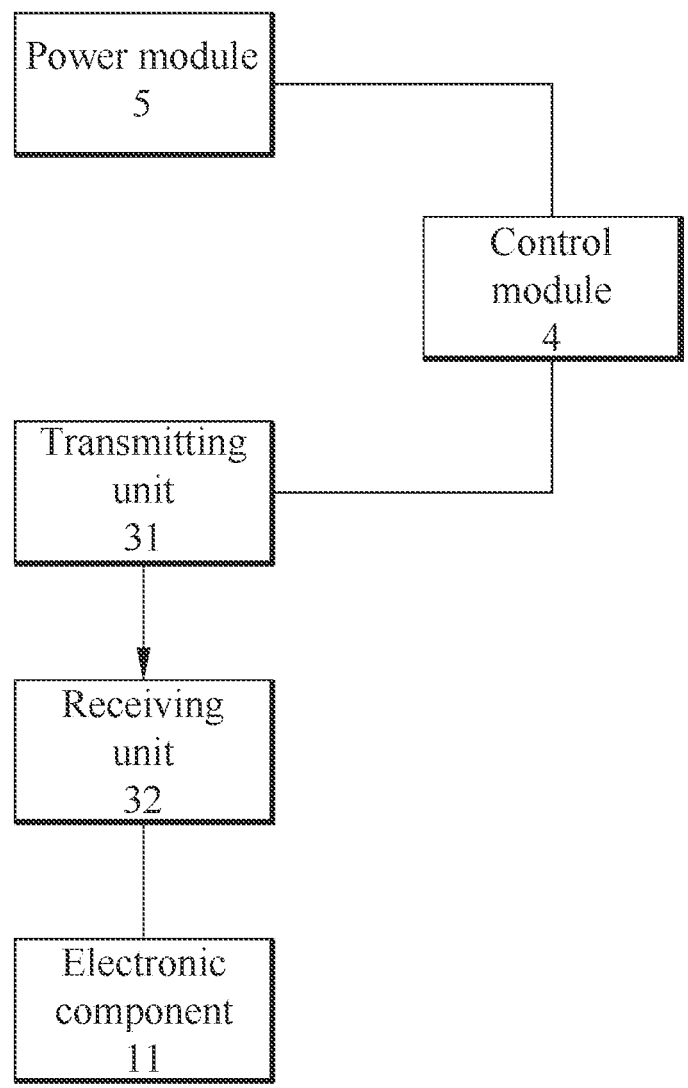
FIG. 8 is a schematic view of the connections of the electrical components in the display device according to the present invention.

Reference is made to FIG. 1 to FIG. 2. FIG. 1 is a schematic view of the display device 1000 of the present invention. FIG. 2 is a partial schematic view of the display device 1000 according to the present invention. The display device 1000 is disposed on a working surface P, and includes a supporting stand 1, a display 2, a wireless charging module 3, a control module 4 and a power module 5 (see FIG. 8). The supporting stand 1 is disposed on the working surface P, and includes at least one electronic components 11, a bearing unit 12 and a through hole 13 (see FIG. 3). Each of the electronic components 101 may be a light emitting diode (LED) module, but not limited thereto.

Figure 3:
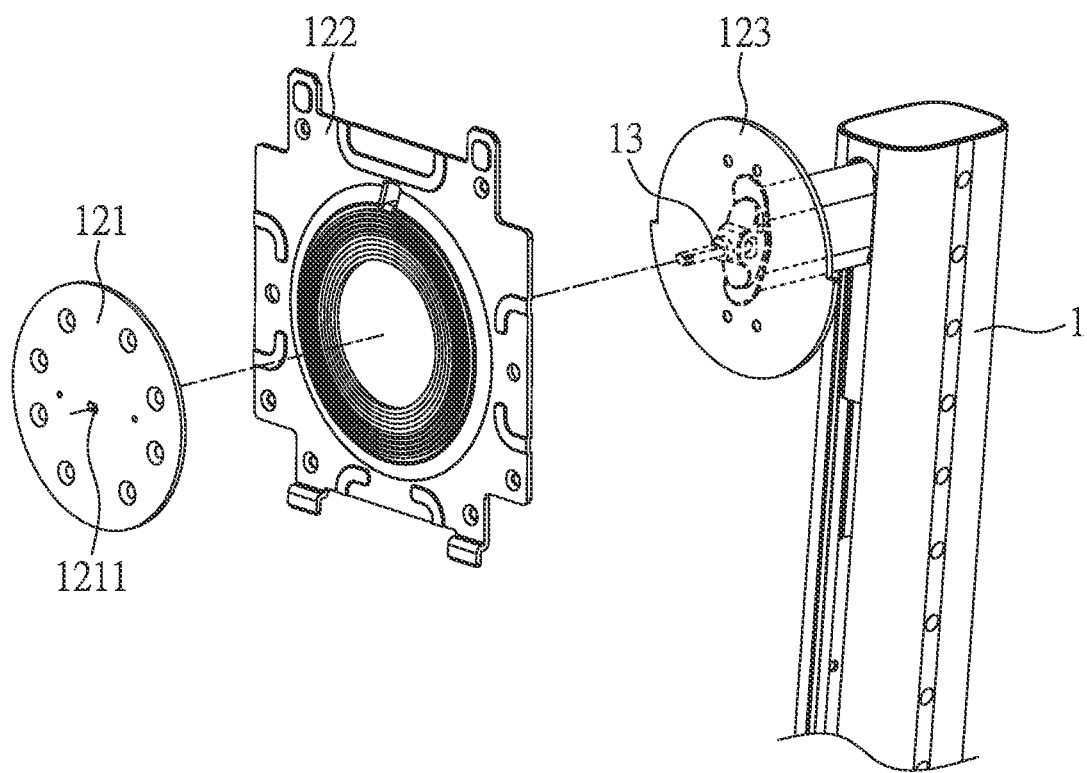
FIG. 3 is a schematic view of the bearing unit according to the present invention.
Figure 4:
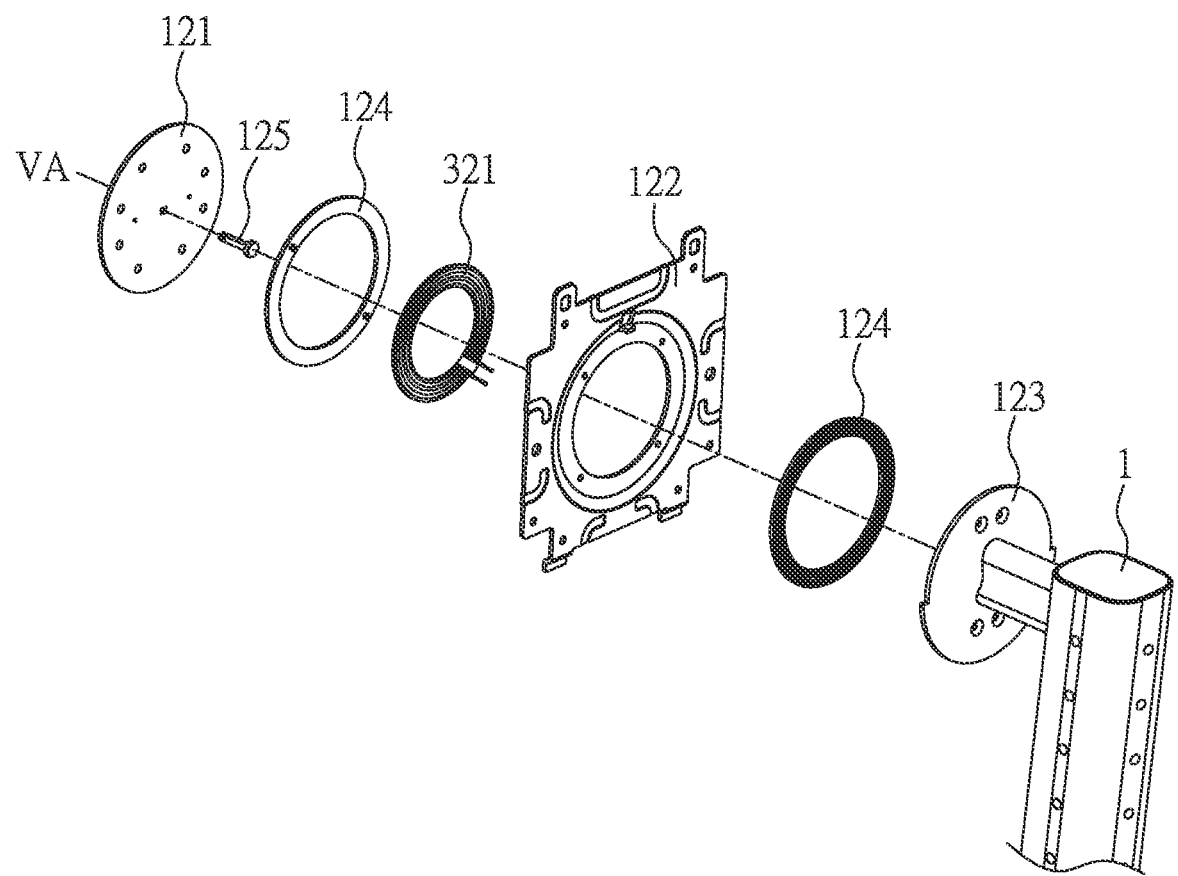
FIG. 4 is an exploded view of the bearing unit according to the present invention.

Reference is made to FIG. 3 to FIG. 4 which are exploded views of the supporting stand 1 according to the present invention. The bearing unit 12 includes a front board 121, a main board 122, a rear board 123, two friction rings 124 and a shaft 125. The front board 121 has a through hole 1211. The main board 122 is disposed between the front board 121 and the rear board 123 and is pivotable relative to the front board 121 and the rear board 123 with a virtual axis VA. The two friction rings 124 are disposed between the front board 121 and the main board 122 and between the main board 122 and the rear board 123 respectively. Thereby, the main board 122 is prevented from being abraded with the front board 121 and the rear board 123 when the main board 122 is pivoted.

Figure 5:
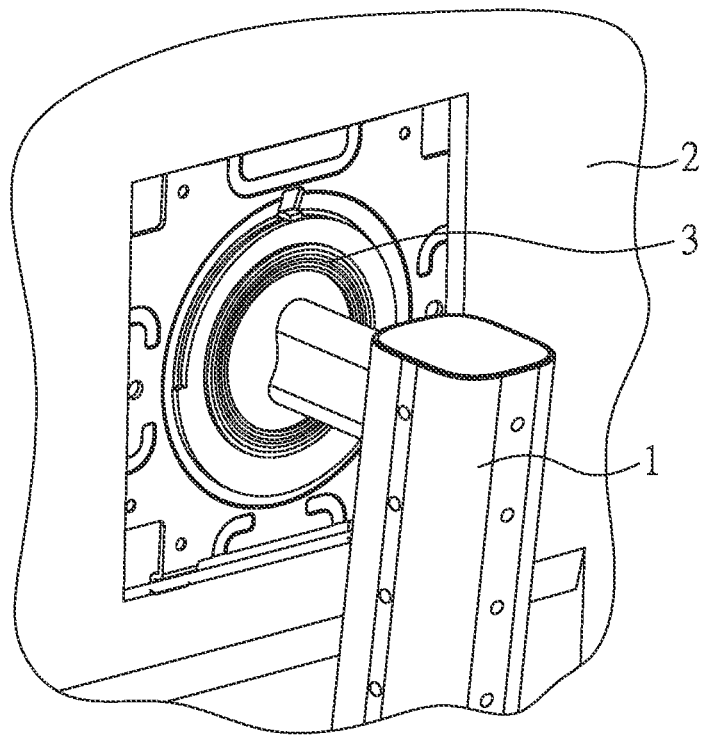
FIG. 5 is a partial schematic view of the display device according to the present invention.
Figure 6:
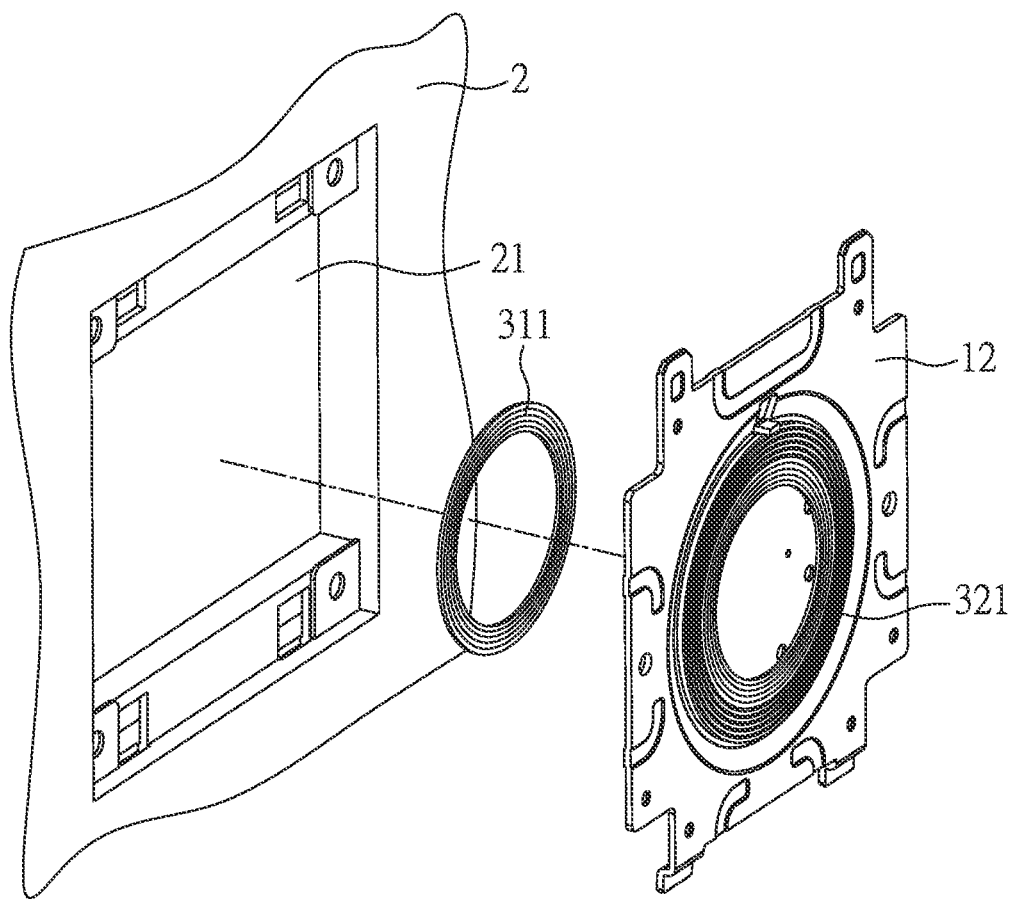
FIG. 6 is a partial schematic view of the display device according to the present invention.

Please refer to FIG. 5 and FIG. 6 together. The display 2 further includes an assembly part 21 which can be detachable with the bearing unit 12. The display 2 is changeable about a virtual axis VA between a portrait position and a landscape position relative to the supporting stand 1. The shaft 125 extends along the virtual axis VA, and penetrates through the supporting stand 1, the main board 122 and the front board 121 via the through hole 13 and the sleeve hole 1211. The cross section of the shaft 125 is different from the cross section of the sleeve hole 1211 and the cross section of the through hole 13. In other words, the front board 121 and the rear board 123 do not rotate with the shaft 125. The assembly part 21 and the main board 122 respectively have a plurality of fixing holes, and the positions of the fixing holes on the main board 21 correspond to the positions of the fixing holes on the main board 122 to make the main board 122 can be fixed to the assembly part 21 via the fixing element (such as screws). As shown in FIG. 5, the display 2 rotates with the shaft 125 after assembling with the supporting stand 1.

Figure 7:
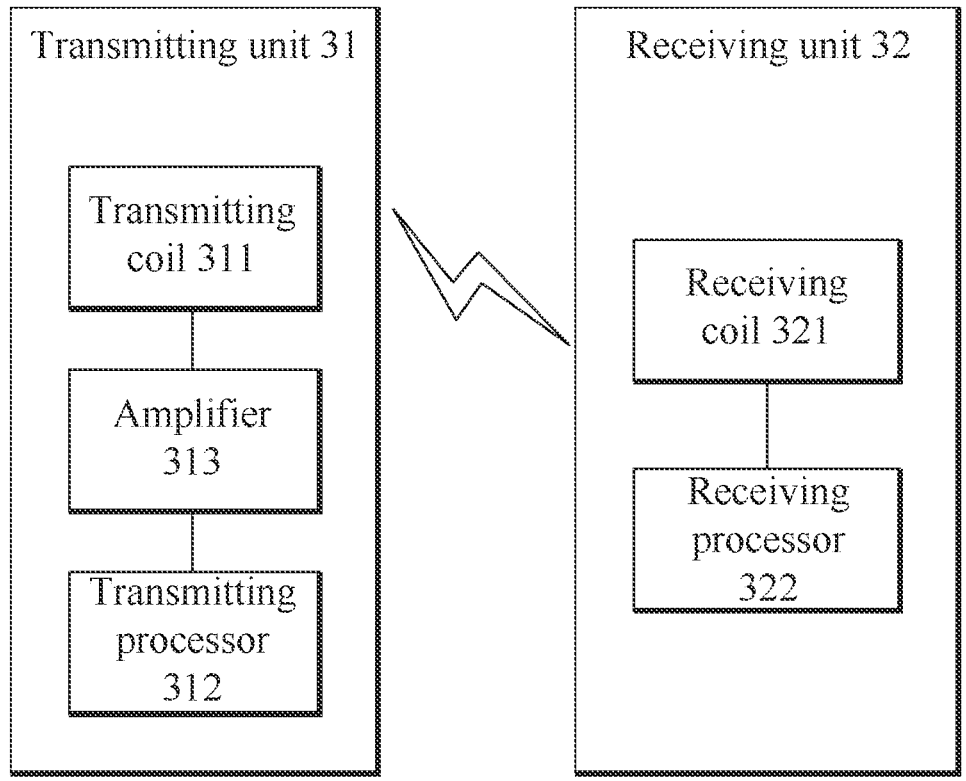
FIG. 7 is a schematic view of the connections of the electrical components in the transmitting unit and the receiving unit according to the present invention.

The wireless charging module 3 is disposed between the supporting stand 1 and the display 2, and selectively operates the electronic components 11. Please refer to FIG. 7 and FIG. 8, the wireless charging module 3 includes a transmitting unit 31 and a receiving unit 32. The transmitting unit 31 is disposed on a side of the display 2, and has a transmitting coil 311, a transmitting processor 312 and an amplifier 313. The transmitting coil 311 is substantially disposed about the virtual axis VA, and is adjacent to the assembly part 21. The receiving unit 32 is disposed on the other side of the supporting stand 1 and is coupled to the electronic components 11. The receiving unit 32 has a receiving coil 321 and a receiving processor 322. The receiving coil 321 is disposed in the bearing unit 12 and sleeved on the shaft 25. The receiving coil 321 is substantially disposed about the virtual axis VA, and is separated from the transmitting coil 311 by a distance that can maintain the magnetic sensing.

The control module 4 is disposed on the display 2 and coupled to the transmitting unit 31. The control module 4 controls the transmitting unit 31 to transmit a mixed signal to make the transmitting coil 311 transmits power to the receiving coil 321. The receiving unit 32 receives the mixed signal via the receiving coil 321, and the receiving unit 32 selectively transmits an enabling signal to the at least one electronic components 11 according to the mixed signal.

Specifically, the control module 4 is electrically connected to the power module 5. After the power module 5 provides power to the control module 4, the control module 4 transmits the control sub-signal for controlling the electronic components 111 and transmits the AC voltage sub-signal for supplying power to the transmitting processor 312. The transmitting processor 312 modulates the AC voltage sub-signal and the control sub-signal to generate a mixed signal, and transmits the mixed signal to the amplifier 313.

The amplifier 313 is disposed between the transmitting processor 312 and the transmitting coil 311 and is electrically connected with the transmitting processor 312 and the transmitting coil 311. After receiving the mixed signal from the transmitting processor 312, the amplifier 313 amplifies the mixed signal to a frequency suitable for near field transmission, and then transmits the amplified mixed signal via the transmitting coil 311.

After the transmitting coil 311 is powered, a magnetic field will be generated. When the distance between the receiving coil 321 and the transmitting coil 311 is less than the maximum sensing distance (for example: 5 mm) between the transmitting coil 311 and the receiving coil 321, the receiving coil 321 may induct the magnetic field of the transmitting coil 311, and generates inductive current and receives the mixed signal. After receiving the mixed signal via the receiving coil 321, the receiving processor 312 may provide DC power and control signal to the electronic components 11 according to the mixed signal, and control the electronic components 11 to light.

The mixed signal includes an AC voltage sub-signal and a control sub-signal. The control sub-signal further has a data segment, a plurality of the control signal regions, a start segment and an end segment. The start segment, the data segment and the end segment respectively includes a plurality of the control signal regions. The data segment is between the start segment and the end segment. The voltage levels of the control signal regions are distinguishably similar, and the time periods of the control signal regions are distinguishably similar. The start segment includes two of the control signal regions. In the first control signal region of the two of the control signal regions, the voltage level is the minimum level, and in the second control signal area of the two of the control signal regions, the voltage level is the maximum level. The end segment includes a plurality of control signal regions, the voltage levels of the control signal regions are the maximum level.

The receiving processor 322 transmits an enabling signal to at least one of the electronic components 11 according to the data segment and a transformed value of the voltage levels of the control signal region. Specifically, when the receiving processor 322 receives the mixed signal via the receiving coil 321, the receiving processor 322 calculates a clock count and determines the voltage level of each of the control signal regions. The clock count has 1 to P time points. P is a positive integer greater than 2, and the default starting level is defined when the receiving processor 322 determines that the voltage level is a minimum level at the first time point, and the voltage level is a maximum level at the second time point.

The receiving processor 322 has a default starting level and a default ending level. When the voltage level of the start segment corresponds to the default starting level and the voltage level of the end segment corresponds to the default ending level, the receiving processor 322 transmits the enabling signal according to the voltage level of the data segment. The default ending level is defined when the voltage level of the receiving processor 322 is the maximum level from the $N^{th}$ time point to the $M^{th}$ time point of the clock count, wherein N and M are respectively a positive integer between 2 and P, and M is greater than N.

According to the above, the display device of the present invention includes the control module, the transmitting coil, the transmitting processor and the amplifier disposed on the display, and the receiving coil and the receiving processor disposed on the supporting stand. After the display is assembled with the supporting stand, the distance between the receiving coil and the transmitting coil is less than the maximum sensing distance. When the display is powered on, the current flows through the transmitting coil, the transmitting coil generates a magnetic field, and the receiving coil generates an induced current in response to the magnetic field to supply power to the electrical components on the supporting stand. In addition, the control module can transmit control sub-signals to the receiving processor via the transmitting coil, so that the receiving processor can control the electronic components to perform corresponding operations according to the control sub-signals.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A display device being disposed on a working surface, comprising:
   a supporting stand being disposed on the working surface, and comprising at least one electronic component;

a display being changeable about a virtual axis between a portrait position and a landscape position relative to the supporting stand;

a wireless charging module being disposed between the supporting stand and the display, being able to operate the electronic component, and comprising:

a transmitting unit being disposed on the display, and having a transmitting coil, and being substantially disposed about the virtual axis;

a receiving unit being disposed on the supporting stand, being coupled to the electronic component, and having a receiving coil, wherein the receiving coil is substantially disposed about the virtual axis and separated from the transmitting coil by a distance, and wherein the distance is less than a maximum sensing distance between the transmitting coil and the receiving coil; and a control module being disposed on the display and coupled to the transmitting unit;

wherein the control module controls the transmitting unit to transmit a mixed signal to make the transmitting coil transmits power to the receiving coil, the receiving unit receives the mixed signal via the receiving coil, and the receiving unit selectively transmits an enabling signal to the at least one electronic components based on the mixed signal.

2. The display device as claimed in claim 1, wherein the supporting stand further comprises a bearing unit, the display further comprises an assembly part which is detachable with the bearing unit, the transmitting coil is adjacent to the assembly part, and the receiving coil is disposed in the bearing unit.

3. The display device as claimed in claim 2, wherein the bearing unit further comprises a front board, a main board and a rear board, and wherein the receiving coil is accommodated in the main board, and the main board, disposed between the front board and the rear board, is pivotable relative to the front board and the rear board about the virtual axis.

4. The display device as claimed in claim 3, wherein the bearing unit further comprises two friction rings being disposed between the front board and main board and between the main board and the rear board respectively.

5. The display device as claimed in claim 4, wherein the bearing unit further comprises a shaft, the shaft extends along the virtual axis and penetrates through the supporting stand, the main board and the front board, and the receiving coil is sleeved on the shaft.

6. The display device as claimed in claim 5, wherein the supporting stand further comprises a through hole, the front board has a sleeve hole, the shaft penetrates through the through hole and the sleeve hole, a cross-section of the sleeve hole is different from a cross-section of the shaft, and a cross-section of the through hole is different from the cross-section of the shaft.

7. The display device as claimed in claim 1, wherein the distance between the receiving coil and the transmitting coil is less than 5 mm.

8. The display device as claimed in claim 7, wherein the transmitting unit further comprises a transmitting processor and an amplifier, the amplifier is disposed between the transmitting processor and the transmitting coil and is electrically connected with the transmitting processor and the transmitting coil, and the mixed signal comprises an alternating current (AC) voltage sub-signal and a control sub-signal.

9. The display device as claimed in claim 8, wherein the control sub-signal has a data segment, the receiving unit further comprises a receiving processor, and the receiving processor transmits the enabling signal to at least one of the electronic component according to the data segment.

10. The display device as claimed in claim 9, wherein the control sub-signal further has a plurality of control signal regions, each of the control signal regions has a voltage level and a time period.

11. The display device as claimed in claim 10, wherein the control sub-signal further has a start segment and an end segment, the data segment is between the start segment and the end segment, and the start segment, the data segment and the end segment respectively includes a plurality of the control signal regions.

12. The display device as claimed in claim 11, wherein when the receiving processor receives the mixed signal through the receiving coil, the receiving processor calculates a clock count and determines the voltage level of each of the control signal regions.

13. The display device as claimed in claim 12, wherein the receiving processor has a default starting level and a default ending level, and when the voltage level of the start segment corresponds to the default starting level and the voltage level of the end segment corresponds to the default ending level, the receiving processor transmits the enabling signal according to the voltage level of the data segment.

14. The display device as claimed in claim 13, wherein the data segment comprises a plurality of the control signal regions, and the receiving processor receives the voltage level of the control signal regions, transforms the voltage level to a value, and transmits the enabling signal to the corresponding electronic component according to the value.

15. The display device as claimed in claim 14, wherein the clock count has 1 to P time points, wherein P is a positive integer greater than 2, and the default starting level is defined when the receiving processor determines that the voltage level is a minimum level at the first time point, and the voltage level is a maximum level at the second time point.

16. The display device as claimed in claim 15, wherein the start segment comprises two of the control signal regions, wherein in a first control signal region of the two of the control signal regions, the voltage level is a minimum level, and wherein in a second control signal area of the two of the control signal regions, the voltage level is a maximum level.

17. The display device as claimed in claim 16, wherein the default ending level is defined when the voltage level of the receiving processor is the maximum level from the $N^{th}$ time point to the $M^{th}$ time point of the clock count, wherein N is a positive integer between 2 and P, M is a positive integer between 2 and P, and M is greater than N.

18. The display device as claimed in claim 17, wherein the end segment comprises a plurality of the control signal regions, and the voltage levels of the control signal regions are the maximum level.

19. The display device as claimed in claim 18, wherein each of the electronic components is a light emitting diode (LED) module.

\* \* \* \* \*